(12) United States Patent
Beute et al.

(10) Patent No.: US 7,955,468 B2
(45) Date of Patent: Jun. 7, 2011

(54) PNEUMATICALLY ACTUATED INFRARED WELDING METHOD AND APPARATUS

(75) Inventors: Scott M. Beute, West Olive, MI (US); David A. Allen, Grand Rapids, MI (US); Roger G. Miller, Jr., West Olive, MI (US); Mark W. Essenburg, Zeeland, MI (US)

(73) Assignee: Extol Inc., Zeeland, MI (US)

( * ) Notice: Subject to any disclaimer, the term of this patent is extended or adjusted under 35 U.S.C. 154(b) by 887 days.

(21) Appl. No.: 11/859,998

(22) Filed: Sep. 24, 2007

(65) Prior Publication Data

US 2009/0078367 A1    Mar. 26, 2009

(51) Int. Cl.
*B29C 65/14* (2006.01)
(52) U.S. Cl. ............ 156/272.2; 156/275.1; 156/379.6; 156/380.9; 392/419; 392/421
(58) Field of Classification Search .......... 156/275.1, 156/380.9, 272.2, 379.6; 392/419, 421
See application file for complete search history.

(56) References Cited

U.S. PATENT DOCUMENTS

| | | | |
|---|---|---|---|
| 3,621,198 A | 11/1971 | Herbrich | |
| 3,649,811 A | 3/1972 | Schoenthaler | |
| 3,804,691 A | 4/1974 | Trivedi | |
| 4,031,351 A * | 6/1977 | Martin | 219/121.67 |
| 5,151,149 A * | 9/1992 | Swartz | 156/379.8 |
| 6,099,291 A | 8/2000 | Lanser | |
| 6,296,470 B1 | 10/2001 | Lanser et al. | |
| 6,544,022 B2 | 4/2003 | Lanser et al. | |
| 7,006,763 B2 | 2/2006 | Miller et al. | |
| 2006/0175004 A1 * | 8/2006 | Kurosaki et al. | 156/272.8 |
| 2006/0283544 A1 * | 12/2006 | Mori et al. | 156/272.8 |

* cited by examiner

*Primary Examiner* — Richard Crispino
*Assistant Examiner* — Elizabeth Royston
(74) *Attorney, Agent, or Firm* — Price, Heneveld, Cooper, DeWitt & Litton, LLP

(57) ABSTRACT

An infrared light source focuses infrared energy onto a work surface through the open end of a concentrator. The open end of the concentrator includes an elastomeric seal for sealably coupling the end of the concentrator directly to a work piece. Pneumatic pressure is applied through the concentrator and the seal to urge the work pieces together during the heating process to complete the weld. The method of infrared (IR) welding includes the steps of applying concentrated IR energy to at least one thermoplastic member while simultaneously applying pneumatic pressure to the work pieces for welding one member to another.

13 Claims, 2 Drawing Sheets

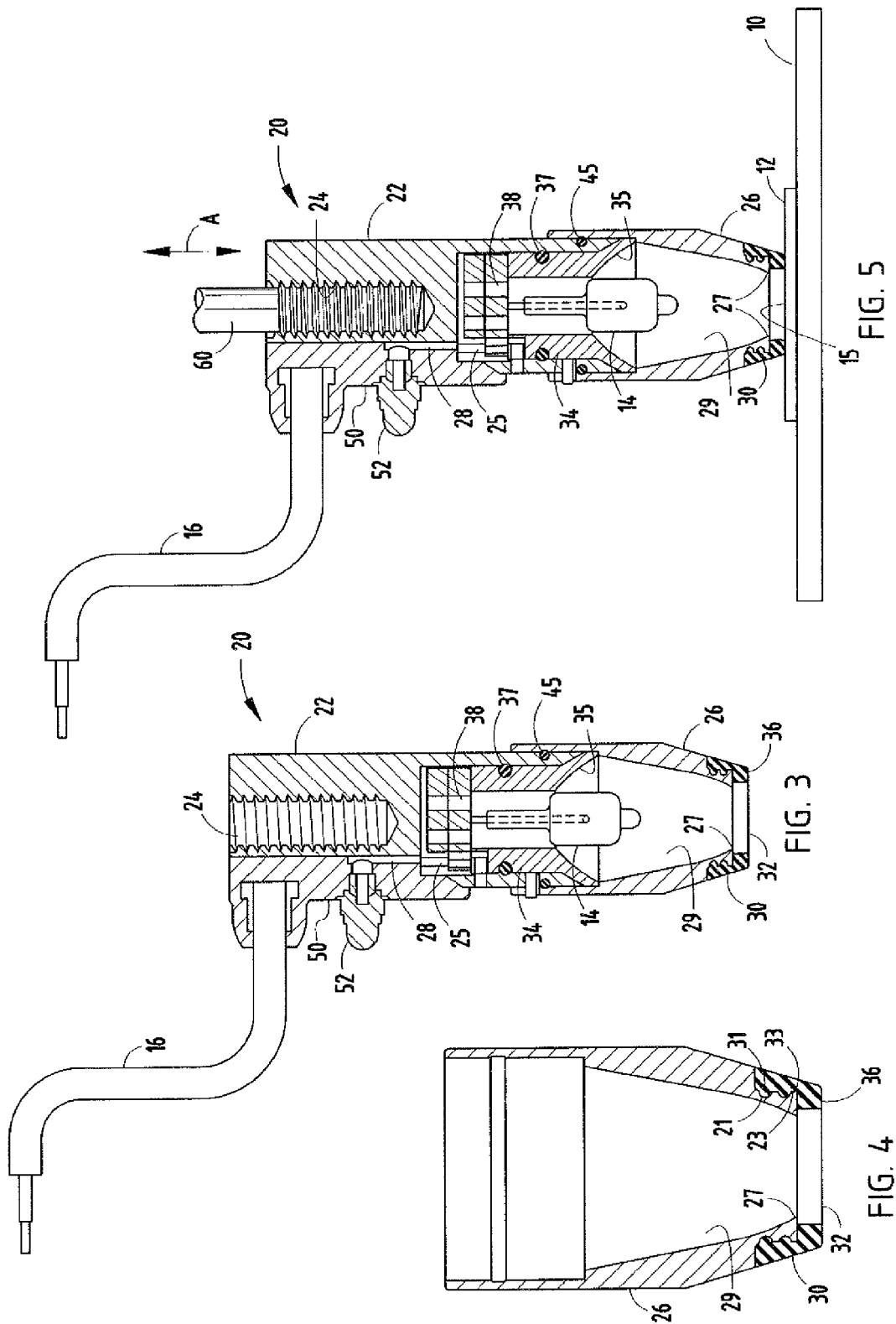

PNEUMATICALLY ACTUATED INFRARED WELDING METHOD AND APPARATUS

BACKGROUND OF THE INVENTION

The present invention relates to a thermoplastic welding process and apparatus in which infrared energy is employed as a heat source and pneumatic pressure is used to force one member against another for welding.

There exists a variety of welding techniques for attaching two thermoplastic materials during the manufacture of articles, such as automobile interior panels and the like. Such methods and apparatus include hot plate welding, hot air jet welding, laser welding, and ultrasonic welding. In recent years, the use of infrared welding, such as represented by U.S. Pat. No. 7,006,763, has been employed and represents an improved, relatively inexpensive and easily serviceable system for providing multiple welds coupling one thermoplastic part to another. In such a system, infrared energy from, for example, a halogen light source is focused on a work piece through a compound parabolic concentrator (CPC) or Winston cone and, subsequently, pressure is applied by mechanical means, such as an anvil or punch, for completing the welding process. Cooling air may be supplied for cooling the lamp and work piece. Although such a system provides an improved heat staking or infrared welding of thermoplastic materials, it still requires the use of movable mechanical arms for staking the work pieces together for completing the welding process after the infrared heating cycle.

There remains a need, therefore, for an improved method and apparatus for infrared welding of thermoplastic materials which does not employ mechanical staking or punching devices for completion of the welding process.

SUMMARY OF THE INVENTION

The system of the present invention satisfies this need by providing an infrared light source which focuses infrared energy onto a work surface through the open end of a reflector. The open end of the reflector includes an elastomeric seal for sealably coupling the end of the reflector directly to a work piece. Pneumatic pressure is applied through the reflector and the seal to urge the work pieces together during the heating process to complete the weld. In a preferred embodiment, the reflector is a compound parabolic concentrator (CPC) or a Winston cone.

The method of infrared (IR) welding of the present invention includes the steps of applying concentrated IR energy to thermoplastic members while simultaneously applying pneumatic pressure to the work pieces for welding one member to another. With such a system and method, therefore, there is no need for separate mechanical anvils, punches or other mechanical feature to press the work pieces together.

The systems and methods of the preferred embodiments of the present invention, therefore, include a source of infrared energy including a concentrator having an open end facing a work piece, a seal extending between the open end of the concentrator and sealably engaging the work piece, and a supply of pneumatic pressure for pressurizing the interior space of the concentrator and urging the work pieces together while infrared energy is applied for completing the weld. The preferred methods embodying the present invention include the steps of sealing an infrared source of light to a work piece, applying infrared energy to the work pieces and applying pneumatic pressure to the work pieces through the source of infrared energy to urge the work pieces together during the thermoplastic welding of them.

These and other features, objects and advantages of the present invention will become apparent upon reading the following description thereof together with reference to the accompanying drawings.

BRIEF DESCRIPTION OF THE DRAWINGS

FIG. 3 is a vertical cross-sectional view of the apparatus shown in FIG. 1;

FIG. 4 is an enlarged cross-sectional view of the concentrator and seal of the apparatus as shown also in FIG. 3; and FIG. 5 is a cross-sectional view illustrating the method of operation of the apparatus shown in FIGS. 1-4.

DETAILED DESCRIPTION OF THE PREFERRED EMBODIMENT

Figure 2:
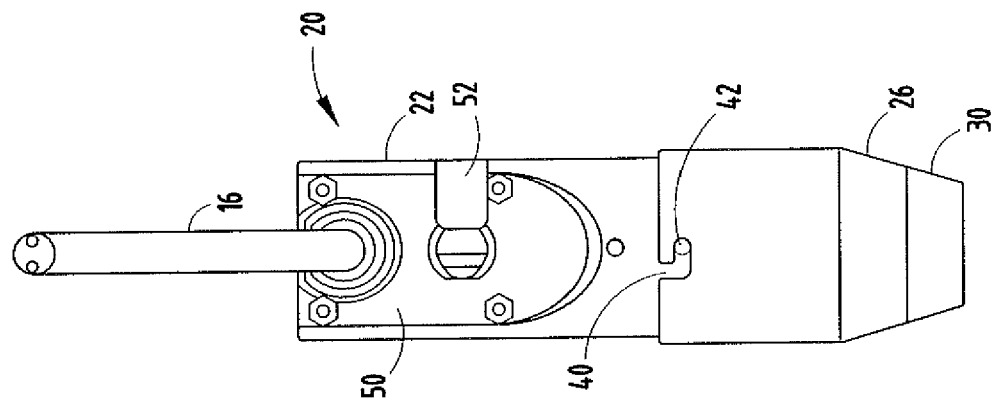
FIG. 2 is a left side elevational view of the apparatus shown in FIG. 1.
Figure 1:
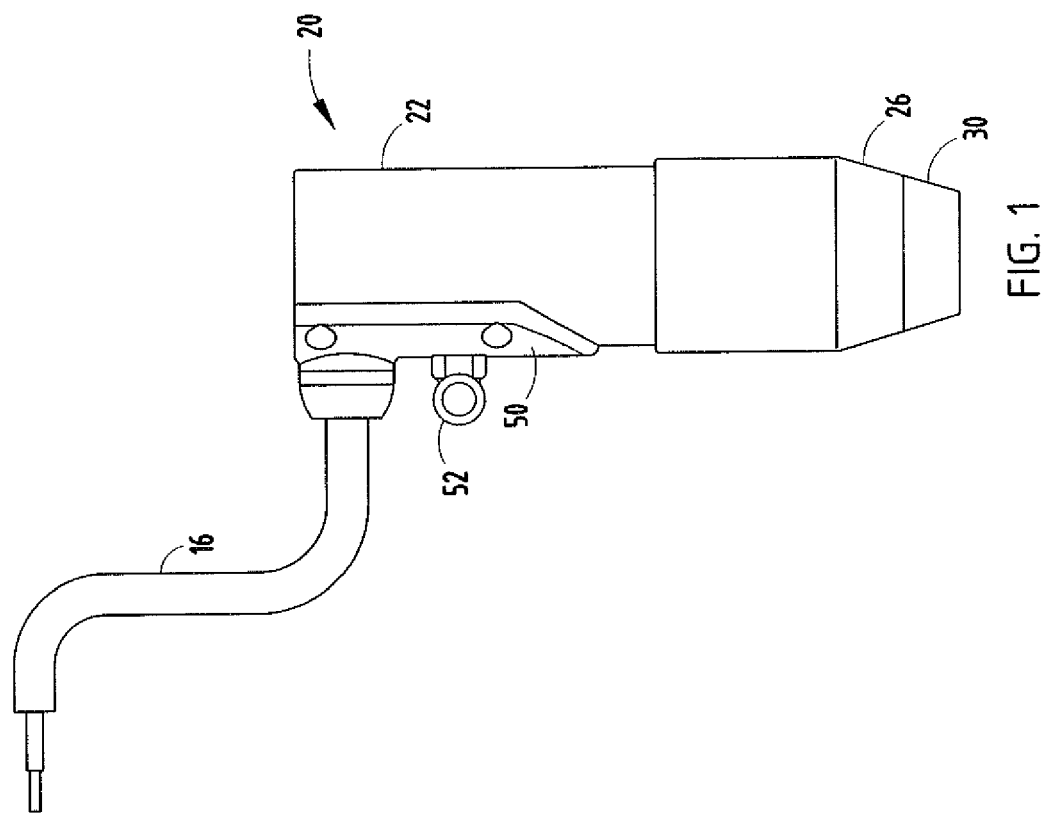
FIG. 1 is a front elevational view of an infrared welding apparatus of the present invention.

Referring initially to FIG. 5, there is shown a substrate 10 to which a work piece or thermoplastic part 12 is to be welded. One of the members 10 or 12 is made of a polymeric thermoplastic material which can be heated and fused utilizing infrared energy from a source 14, such as a halogen lamp within the welding apparatus 20 of the present invention. Thus, one of the materials 10 or 12 may be polypropylene, polyethylene, polyvinylchloride, or a combination of such materials which may be employed for various parts, such as for automotive or other applications, including visors, door panels, headliners with thermoplastic crush absorbing panel members or the like, in which it is desired to secure one member to another without the need for separate mechanical fasteners.

As best seen in FIGS. 1-4, molding apparatus 20 includes a cylindrical body 22 with a recess 24 for mounting the body to a vertically movable actuator 60 (FIG. 5) in a conventional manner, such that the welding apparatus 20 can be moved from a raised position spaced from the work piece 12 to the welding position shown in FIG. 5. In the welding position, the lower surface 36 (FIG. 4) of an elastomeric seal 30 positioned at the end of a concentrator 26 surrounds the circular or other shaped opening 27 of the concentrator 26 and is in contact with and sealably engages the work piece 12. The welding apparatus 20 includes a bulb socket 38 for receiving the infrared energy producing bulb 14, such as a 100 watt halogen lamp. A supply conductor 16 for electrical energy is coupled to the bulb socket 38 in a conventional manner through the housing 22 to supply electrical operating energy to the bulb. Housing 22 sealably receives a reflector 34 by O-ring 37. Reflector 34 surrounds the bulb 14 and has a parabolic surface 35 which collimates the IR rays. The concentrator directs the collimated rays downwardly through the open lower exit end 27 of the concentrator and opening 32 in the seal 30. Concentrator 26 is a non-image-forming offset parabolic reflector similar to that described in detail in U.S. Pat. No. 7,006,763, the disclosure of which is incorporated herein by reference. The pattern of radiant energy projected by concentrator 26 onto area 15 (FIG. 5) is an annular pattern. Concentrator 26 is coupled to housing 22 by opposed bayonet twist lock mounting slots and posts 40, 42, as seen in FIG. 2, to provide easy access for replacement of bulb 14 as necessary. O-ring seal 45 seals concentrator 26 to housing 22.

Coupled to housing 22 by means of a supply conduit 52 (FIGS. 1 and 2) for pressurized air from a suitable source, such as a compressor, air tank, or the like. Pressurized air from the source extends through a channel 28 in seat plate 50

(FIGS. 3 and 4) and downwardly through aperture 25 in the socket 38 and into the center area 29 of concentrator 26. The seal 30, which surrounds and is mounted to concentrator 26, as best seen in FIG. 4, by a plurality of ridges and channels 31 and 33, respectively, conforming to corresponding channels and ridges 21 and 23 in concentrator 26 for sealably snap-fitting the elastomeric seal onto the lower end of concentrator 26. Seal 30 has an annular surface 36 in the embodiment shown which surrounds the work piece 12 in the area 15 (FIG. 5) being welded. In the embodiment shown, area 15 is generally circular, although other geometries can also be employed depending on the geometry of the work piece involved.

As seen in FIG. 5, the welding apparatus 20 is mounted to an actuator arm 60 which moves upwardly and downwardly, as indicated by arrow A in FIG. 5, between a non-contacting position and the welding position shown in FIG. 5. In an assembly environment, an array of welding units 20 may be mounted on a single platen in a pattern which conforms to the desired weld pattern between the work piece and the substrate to which the work piece is to be welded.

In one embodiment of the invention, the pressure applied between the surface 36 of the seal and the work piece 12 by arm 60 was approximately 10 to 40 pounds to effectively seal the concentrator 26 to the work piece 12. The hold time was from about 2 to about 20 seconds with pneumatic pressure from conduit 52 at a pressure of from about 10 to about 80 pounds per square inch (PSI), depending upon the geometry of the work piece in relation to the substrate. Subsequent to the heating and holding time, the cooling time of from about 2 to about 20 seconds is achieved by moving the welding apparatus 20 about ⅛ inch from the surface 12 of the work piece and providing a cooling air flow of from about 1 to about 5 cubic feet per minute for a time sufficient to harden the molten weld area. Typically, the work piece and substrate are heated to a temperature of about 500° F. during the heat applying step by applying sufficient infrared energy from source 14 to the welding area 15 during the heating step. By supplying air pressure during the heating step of from about 10 to about 80 PSI, the pneumatic pressure (when seal 30 sealably engages surface 15 of the work piece 12) adds to the clamping pressure from arm 60 to effectively press the work piece 12 into the melted substrate 10 for the fusion/welding process. Only one of the members 10, 12 need be a thermoplastic material, although in some applications both members will be thermoplastic. The elastomeric material employed for the seal 30 is selected to withstand the temperatures involved and may, for example, be a urethane or other suitable polymeric seal which is capable of withstanding the temperatures involved in the welding process and provide an effective seal between the concentrator 26 and work piece 12 during the welding process.

The control of actuator arm 60 and the application of pneumatic pressure to conduit 52 as well as power applied by conductor 16 to lamp 14 is achieved by conventional electro-pneumatic devices, such as valves and cylinders, and electrical control circuits known to those skilled in the art. The pressures applied and the holding time will vary depending on the thickness of the work piece, their material including color, and other well known factors to those in the infrared welding art.

It will become apparent to those skilled in the art that various modifications to the preferred embodiment of the invention as described herein can be made without departing from the spirit or scope of the invention as defined by the appended claims.

The invention claimed is:

1. An infrared welding apparatus, for welding a work piece to a substrate comprising:
    a source of infrared radiation;
    a housing for said source, said housing including an open end for facing and engaging a work piece;
    a seal positioned on said housing and surrounding said open end for contacting a work piece; and
    a source of pneumatic pressure coupled to said housing for applying pneumatic pressure within said housing to pressurize the area within the seal when said open end of said housing is pressed against a work piece for holding a work piece against a substrate.

2. The welding apparatus as defined in claim 1 wherein said seal is an elastomeric seal.

3. The welding apparatus as defined in claim 2 wherein said housing includes a parabolic concentrator having an exit end and said seal is coupled to said exit end of said concentrator.

4. The welding apparatus as defined in claim 3 wherein said source of infrared energy includes a halogen lamp.

5. The welding apparatus as defined in claim 4 wherein said concentrator includes channels near said exit end and wherein said elastomeric seal is snap-fitted in said channels near said exit end of said concentrator.

6. The welding apparatus as defined in claim 5 wherein said source of pressure supplies pressure to a weld area surrounded by said seal at a pressure of from about 10 PSI to about 80 PSI.

7. The welding apparatus as defined in claim 6 and further including an actuator arm for moving said housing toward and away from a work piece, and wherein said actuator arm holds said seal against the work piece for a period of from about 2 seconds to about 20 seconds.

8. An infrared welding apparatus for welding a work piece to a substrate comprising:
    a housing for a source of infrared radiation, said housing including an open end facing a work piece;
    a source of infrared radiation mounted within said housing for directing concentrated infrared radiation toward said open end;
    a seal mounted to said open end of said housing and surrounding said open end; and
    a source of pneumatic pressure coupled to said housing for applying pneumatic pressure to the area within the seal between said housing and work piece when said seal of said housing is pressed against a work piece to form a seal between said housing and said work piece.

9. The welding apparatus as defined in claim 8 wherein said seal is an elastomeric seal.

10. The welding apparatus as defined in claim 9 wherein said housing includes a compound parabolic concentrator having an exit end and said seal and said exit end include complimentary grooves and ridges for snap fitting said seal to said exit end of said concentrator.

11. The welding apparatus as defined in claim 10 wherein said source of infrared energy includes a halogen lamp.

12. The welding apparatus as defined in claim 11 wherein said source of pressure supplies pressure to a weld area surrounded by said seal at a pressure of from about 10 PSI to about 80 PSI.

13. The welding apparatus as defined in claim 12 and further including an actuator arm for moving said housing toward and away from a work piece, and wherein said actuator arm holds said seal against the work piece for a period of from about 2 seconds to about 20 seconds.

* * * * *